3,147,256
PREPARATION OF THIOSULFENAMIDES
Marlyn J. Brock, Akron, and George D. Louth, Doylestown, Ohio, assignors to The Firestone Tire & Rubber Company, Akron, Ohio, a corporation of Ohio
No Drawing. Filed May 20, 1959, Ser. No. 814,390
10 Claims. (Cl. 260—247.1)

This invention relates to the preparation of thiosulfenamides. Thiosulfenamides are powerful accelerators and curing agents for the vulcanization of natural rubber and the synthetic, sulfur-vulcanizable diene rubbers. These accelerator-curing agents are especially useful in pneumatic tire tread stocks, in which a powerful but delayed-action, non-scorching, curing combination is needed for successful factory processing of the stocks.

The compounds produced in accordance with the present invention are thiosulfenamides, represented by the formula

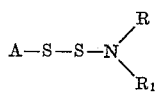

in which A stands for a thiazole, thiazoline, oxazole, imidazole or imidazoline radical, R and $R_1$ are the same or different aliphatic, cycloaliphatic or aralkyl groups or R and $R_1$ together form a single chain (which can contain —$CH_2$—, —O—, —NH— or —S—) constituting with the attached nitrogen atom a heterocyclic radical, and $R_1$ can be hydrogen.

The invention provides a new method of making such thiosulfenamides by interacting an azole mercaptan (A—SH) and a primary or secondary amine with a sulfur halide, preferably sulfur dichloride. The course of the preparation reaction can be represented as follows:

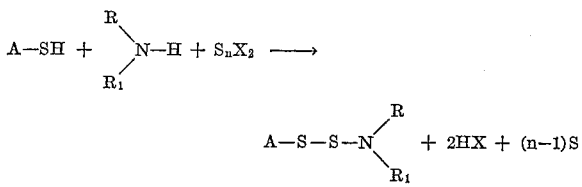

X represents chlorine or bromine. When $SCl_2$ is employed, no free sulfur is obtained. It is desirable to neutralize the halogen acid formed in the reaction by adding either initially or during the course of the reaction some acid-binding substance, such as excess $R(R_1)NH$, ammonia, an alkali metal hydroxide, an alkaline earth metal hydroxide or any of the well known alkaline reacting salts or other compounds which do not compete with the amine employed for coupling to the disulfide linkage. The mercaptan and the amine can be initially reacted to form the amine salt, and the latter can then be reacted with the sulfur halide in the presence of an alkaline substance. Also an inorganic salt of the mercaptan (formed by reacting the mercaptan with ammonia, an alkali metal hydroxide, an alkaline earth metal hydroxide, etc.) can be reacted with the amine and the sulfur halide, and an additional mole of acid-fixing substance added initially or during the reaction.

Having generally described the invention, the following examples are presented for purposes of illustration.

*Example 1*

One-tenth mole (17 grams) of 2-mercaptobenzothiazole was dispersed in 250 ml. of chloroform in a 500 ml., 3-neck flask fitted with a stirrer and a reflux condenser. To the continuously stirred mixture 0.3 mole (27 grams) of morpholine was added and the flask was immersed in an ice bath. One-tenth mole (10 grams) of sulfur dichloride was added dropwise and stirring was continued for one-half hour. The precipitated amine hydrochloride was filtered off and the filtrate was evaporated to dryness. The dry residue was washed with water and then with a little ether. Twenty-five and one-half grams of product (M.P. 127–129° C.) was obtained which constituted 90% of the theoretical yield. The product was identified as N-morpholinylbenzothiazole - 2 - thiosulfenamide by X-ray diffraction techniques; its X-ray diagram was substantially identical to that of an authentic sample of this compound prepared by a known method.

*Example 2*

One-hundredth mole (1.9 grams) of the sodium salt of 2-mercaptobenzothiazole was dissolved in 3.4 grams of morpholine and a small amount of water was added to produce a solution. Chloroform was then added with care being taken not to cause precipitation. One-hundredth mole of sulfur dichloride (0.65 ml.) was dissolved in chloroform and slowly added. The resulting solution was evaporated to dryness. The solid obtained was washed with ether and water. The product had a melting point of 127–129° C. and was identified by X-ray diffraction as N-morpholinylbenzothiazole-2-thiosulfenamide.

*Example 3*

Four-tenth mole (34 grams) of piperidine and 200 ml. of chloroform were placed in a flask, and the solution was cooled in an ice bath. One-tenth mole (10 grams) of sulfur dichloride was diluted to 40 ml. with chloroform and the solution was added dropwise to the flask with constant stirring. Stirring was continued for about five minutes following addition of the sulfur dichloride solution, whereupon 0.1 mole (17 grams) of 2-mercaptobenzothiazole dispersed in 75 ml. of chloroform was slowly added. After it had been stirred for about 15 minutes, the solution was transferred to a crystallizing dish and allowed to evaporate spontaneously. The residual product was washed with water and ether. The air-dried product was characterized by a melting point of 84–85° C. and was analyzed for sulfur, hydrogen and carbon with the following results:

Found: percent S, 33.95; percent C, 50.74; percent H, 5.00. Calculated for $C_{12}H_{14}N_2S_3$, percent S, 34.04; percent C, 51.06; percent H, 4.96.

The ultra-violet absorption characteristics of the product established the presence of a disulfide linkage. The X-ray diffraction diagram of the product was different from that of the reactants, the amine salt and also different from that of 2,2'-dithio-bis-benzothiazole. The product was thus identified as N-piperidinylbenzothiazole-2-thiosulfenamide.

*Example 4*

Fifty ml. of chloroform was placed in a flask and cooled in an ice bath. Dimethylamine gas was bubbled through the chloroform for four minutes and 0.01 mole (1.7 grams) 2-mercaptobenzothiazole was then added with vigorous stirring. Sulfur dichloride (1 ml. diluted to 5 ml. with chloroform) was then added. Additional dimethylamine gas was then bubbled through the solution until it was judged that no more gas was absorbed. Stirring was then continued for 10 minutes. The chloroform soluiton was extracted three times with water, dried with sodium sulfate, filtered, and evaporated to dryness. The solid product melted at 96–98° C. The ultra-violet absorption curve established the presence of a disulfide linkage. The product, in 81% yield, was N,N-dimethyl-2-benzothiazole thiosulfenamide, the X-ray diagram of which was different from that of the reactants, the amine salt and also 2,2'-dithio-bis-benzothiazole.

Example 5

Twenty-seven grams of liquid dimethylamine was dissolved in 500 ml. of chloroform, the temperature being maintained in a water bath at 13° C. A slurry of 34 grams of 2-mercaptobenzothiazole in chloroform was added and the resulting solution was stirred for 10 minutes, at which time the temperature rose to 17° C. Twenty grams of sulfur dichloride dissolved in chloroform was slowly added. The temperature of the resulting mixture was 25° C. The mixture was stirred for two hours more with the temperature being maintained at about 20° C. The chloroform solution was then washed several times with water by agitation in a Waring Blendor until the last wash water had a pH of approximately 8. The solution was then dried with sodium sulfate, treated with activated charcoal and then allowed to evaporate to dryness. The residue was taken up in ether, recrystallized from ether and air dried. The product weighed 20 grams and was characterized by a melting point of 69–70° C. The X-ray diffraction pattern established that the product was the same N,N-dimethyl-2-benzothiazole thiosulfenamide obtained in Example 4.

Example 6

Two hundred and fifty ml. of chloroform was placed in a flask and chilled to −30° C. by means of solid $CO_2$. A dimethylamine cylinder was inverted and 13.5 grams of the liquid was weighed into a beaker and immediately added to the chloroform in the reaction vessel. Seventeen grams of 2-mercaptobenzothiazole was added with vigorous stirring. Ten grams of sulfur dichloride was diluted to 25 ml. with chloroform and added dropwise to the mercaptobenzothiazole-chloroform solution in the flask. Stirring was continued for about 15 minutes, and the chloroform solution was then washed with water until the pH of the solution was nearly 7.0. The solution was dried with sodium sulfate and evaporated at 40° C. The residue was treated with diethyl ether and filtered. The ether-insoluble fraction was established by X-ray diffraction to be 2,2′-dithio-bis-benzothiazole. The ether-soluble fraction was established by X-ray diffraction to be the same product as that obtained in Examples 4 and 5. A sample was subjected to analysis for nitrogen and sulfur, with the following results:

|  | Percent Nitrogen | Percent Sulfur |
| --- | --- | --- |
| Found | 11.17 | 39.8 |
| Calculated for $C_9H_{10}S_3N_2$ | 11.57 | 39.7 |

Example 7

One-hundredth mole (1.7 grams) of 2-mercaptobenzothiazole was dispersed in 20 ml. of chloroform, and 0.03 mole (2.6 grams) of morpholine was stirred in. Then 0.01 mole (1.4 grams) of sulfur monochloride was diluted with 5 ml. of chloroform and added dropwise, with constant stirring to the mixture of the azole and amine. After completion of the reaction the precipitated amine hydrochloride was removed by filtration and washed with chloroform. The combined filtrates were evaporated at room temperature. The residue was washed with three portions of water and then with three portions of ether and then allowed to dry. An X-ray diagram of the residue showed it to be substantially identical with that of the N-morpholinyl-2-benzothiazole thiosulfenamide of Examples 1 and 2.

Example 8

One-hundredth mole (1.7 grams) of 2-mercaptobenzothiazole and 3 grams (0.03 mole) of cyclohexylamine were dissolved in 15 ml. of chloroform. Sulfur dichloride (0.65 ml., 0.01 mole) was added slowly with stirring. The solution was cooled during the reaction. At the completion of the reaction a small amount of solid had formed. Upon evaporation of the solvent a yellow solid product was obtained. This solid was washed with water to remove the amine hydrochloride. A sticky solid remained, and this was purified by washing it with ether. The final product was a yellow crystalline solid melting at 128–132° C., the X-ray diffraction diagram of which was substantially different from the X-ray diagrams of the starting materials, the amine salt, 2,2′-dithio-bis-benzothiazole and N-cyclohexyl benzothiazole-2-sulfenamide. Therefore the product was N-cyclohexyl-2-benzothiazole thiosulfenamide of the formula

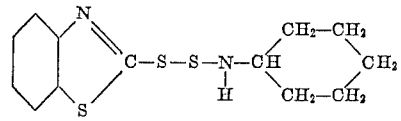

Example 9

Morpholine (23 grams, 0.25 mole) and 2-mercaptobenzothiazole (42 grams, 0.25 mole) were dissolved in 500 ml. of chloroform. A solution of sodium hydroxide (22 grams, 0.5 mole+10% excess) in 150 ml. of water was added, forming two phases in the reaction vessel. Sulfur dichloride (26 grams, 0.25 mole) in 100 ml. of chloroform was added dropwise with stirring. The temperature of the reaction mixture was maintained at 30–40° C. by means of an ice bath. The mixture was stirred for an additional 30 minutes following the sulfur dichloride addition. Then the chloroform layer was separated and washed with water. The solvent was thereafter allowed to evaporate at room temperature. The dried product (43 grams) melted at 122–126° C. A mixed melting point with a known sample of N-morpholinylbenzothiazole-2-thiosulfenamide (M.P. 129–130° C.) was 125–128° C. X-ray analysis of the product showed it to be substantially N-morpholinylbenzothiazole-2-thiosulfenamide with a small amount of 2,2′-dithio-bis-benzothiazole as an impurity.

Other amines can be utilized in the invention in addition to those disclosed above, as follows:

Diethylamine
Di-n-propylamine
Di-n-butylamine
Di-isobutylamine
Di-n-amylamine
Di-isoamylamine
Di-n-hexylamine
Di-n-heptylamine
Di-n-octylamine
Dibenzylamine
Methyl cyclohexylamine
Ethyl cyclohexylamine
Thiomorpholine
4-N-ethylpiperazine
Pyrrolidine
Isopropylamine
t-Butylamine
tt-Octylamine
1-methyl-cyclohexylamine
1-ethyl-cyclohexylamine
1-methyl-cyclopentylamine Thus the amines employed in the invention are represented by the formula

wherein the R's are the same or different aliphatic, cycloaliphatic or aralkyl radicals, $R_1$ can be hydrogen, and R and $R_1$ can be joined to form a single chain (which can contain $-CH_2-$, $-O-$, $-NH-$ or $-S-$) constituting with the attached nitrogen atom a heterocyclic radical.

The mercapto azoles which can be used include the mercaptothiazoles, mercaptoimidazoles and the mercaptooxazoles. Either aliphatic or aromatic azoles can be used. Representative examples are 2-mercaptothiazole
2-mercaptooxazole
2-mercaptoimidazole
2-mercapto-4-methylthiazole
2-mercapto-4-methyloxazole
2-mercapto-4-methylimidazole
2-mercapto-4-ethylthiazole
2-mercapto-4-n-propylthiazole
2-mercapto-4-n-propyloxazole
2-mercapto-4-n-propylimidazole
2-mercapto-4-n-butylthiazole
2-mercapto-4-n-butyloxazole
2-mercapto-4-n-butylimidazole
2-mercapto-4,5-dimethylthiazole
2-mercapto-4,5-dimethyloxazole
2-mercapto-4,5-dimethylimidazole
2-mercapto-4,5-diethylthiazole
2-mercapto-4,5-diethyloxazole
2-mercapto-4,5-diethylimidazole
2-mercapto-4,5-di-n-propylthiazole
2-mercapto-4,5-di-n-propyloxazole
2-mercapto-4,5-di-n-propylimidazole
2-mercapto-4,5-di-n-butylthiazole
2-mercapto-4,5-di-n-butyloxazole
2-mercapto-4,5-di-n-butylimidazole
4-phenyl-2-mercaptothiazole
4-phenyl-2-mercaptooxazole
4-phenyl-2-mercaptoimidazole
4-phenyl-5-methyl-2-mercaptothiazole
4-phenyl-5-methyl-2-mercaptooxazole
4-phenyl-5-methyl-2-mercaptoimidazole
2-mercaptobenzothiazole
4-phenyl-2-mercaptobenzothiazole
6-phenyl-2-mercaptobenzothiazole
2-mercapto-tetrahydrobenzothiazole
2-mercapto-naphthothiazole The 2-mercaptoarylenethiazoles and particularly 2-mercaptobenzothiazole constitute preferred species.

Solvents can often be used to an advantage in carrying out the invention. Suitable solvents are the common inert organic solvents such as chloroform, carbon tetrachloride, trichloroethylene, heptane and petroleum ether.

Higher or lower temperatures than the reaction temperatures of the examples can be employed. The reaction temperature is not critical, but it is desirable to use a temperature that will allow a reasonably rapid rate of reaction, so that the preparation can be carried out economically.

While certain representative embodiments and details are shown herein for the purpose of illustrating the invention, it will be apparent to those skilled in the art that various modifications may be made therein without departing from the spirit or scope of the invention.

We claim:
1. The method of preparing a thiosulfenamide which comprises reacting (a) one mole of an amine selected from the group consisting of (1) an amine represented by the formula

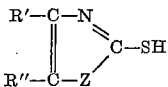

in which R is selected from the group consisting of an alkyl of one to 8 carbon atoms, benzyl, cyclohexyl, 1-methyl-cyclohexyl, 1-ethyl-cyclohexyl and 1-methyl-cyclopentyl, and $R_1$ is selected from the group consisting of hydrogen, an alkyl of one to 8 carbon atoms, benzyl, cyclohexyl, 1-methyl-cyclohexyl, 1-ethyl-cyclohexyl and 1-methyl-cyclopentyl, (2) piperidine, (3) morpholine, (4) thiomorpholine, (5) 4-N-ethylpiperazine and (6) pyrrolidine with (b) one mole of an azole mercaptan selected from the group consisting of (1) a compound represented by the formula

in which R' is selected from the group consisting of hydrogen, an alkyl of one to 4 carbon atoms and phenyl, R" is selected from the group consisting of hydrogen and an alkyl of one to 4 carbon atoms and Z is selected from the group consisting of sulfur, oxygen and N–H, (2) 2-mercaptobenzothiazole, (3) 4-phenyl-2-mercaptobenzothiazole, (4) 6-phenyl-2-mercaptobenzothiazole, (5) 2-mercaptotetrahydrobenzothiazole and (6) 2-mercaptonaphthothiazole and with (c) one mole of a sulfur halide of the formula $$S_nX_2$$

in which $n$ is an integer from 1 to 2 and X is selected from the group consisting of chlorine and bromine.

2. The method of claim 1 in which the amine is morpholine.

3. The method of claim 1 in which the azole mercaptan is 2-mercaptobenzothiazole.

4. The method of claim 1 in which the sulfur halide is sulfur dichloride.

5. The method of claim 1 in which the amine is cyclohexylamine, the azole mercaptan is 2-mercaptobenzothiazole and the sulfur halide is sulfur dichloride.

6. The method of claim 1 in which the amine is morpholine, the azole mercaptan is 2-mercaptobenzothiazole and the sulfur halide is sulfur monochloride.

7. The method of claim 1 in which the amine is morpholine, the azole mercaptan is 2-mercaptobenzothiazole and the sulfur halide is sulfur dichloride.

8. The method of claim 1 in which the amine is dimethylamine, the azole mercaptan is 2-mercaptobenzothiazole and the sulfur halide is sulfur dichloride.

9. The method of claim 1 in which the amine is piperidine, the azole mercaptan is 2-mercaptobenzothiazole and the sulfur halide is sulfur dichloride.

10. The process of reacting in substantially stoichiometric proportions a 2-mercapto-thiazole which may be substituted only in the 4 and 5 positions solely by substituents composed of carbon and hydrogen free of any but aromatic unsaturation, with an amine selected from the group consisting of morpholine, thiomorpholine, N-lower alkyl piperazine, pyrrolidine, and a piperidine containing besides the heterocyclic nitrogen only carbon and hydrogen, and a sulfur halide of the formula $S_nX_2$ where $n$ is an integer of from 1 to 2 and X is halogen, in the presence of a hydrogen halide acceptor.

References Cited in the file of this patent
UNITED STATES PATENTS

| | | |
|---|---|---|
| 1,661,998 | Carson | Mar. 6, 1928 |
| 2,060,428 | Scott | Nov. 10, 1936 |
| 2,259,164 | Jones | Oct. 14, 1941 |
| 2,343,524 | Blake | Mar. 7, 1944 |
| 2,510,894 | Kleiman | June 6, 1950 |
| 2,609,373 | Beaver | Sept. 2, 1952 |
| 2,747,005 | Zerbe et al. | May 22, 1956 |
| 2,766,236 | Harmon | Oct. 9, 1956 |
| 2,835,670 | Hardman | May 21, 1958 |
| 2,850,496 | Hardman | Sept. 2, 1958 |
| 2,873,277 | Sundholm | Feb. 10, 1959 |

FOREIGN PATENTS

| | | |
|---|---|---|
| 711,236 | Great Britain | June 30, 1954 |

OTHER REFERENCES

Michaelis et al.: Ber. Deut. Chem. Gesell., vol. 28, pp. 165–167 (1895).